Feb. 27, 1962   F. C. POLANSKI   3,022,692
TUBE TRIMMING MACHINE
Filed Feb. 27, 1958   4 Sheets-Sheet 1

INVENTOR.
Frank C. Polanski
BY Morsell & Morsell
ATTORNEYS.

Feb. 27, 1962   F. C. POLANSKI   3,022,692
TUBE TRIMMING MACHINE
Filed Feb. 27, 1958   4 Sheets-Sheet 2

INVENTOR.
Frank C. Polanski
BY
Morsell & Morsell
ATTORNEYS.

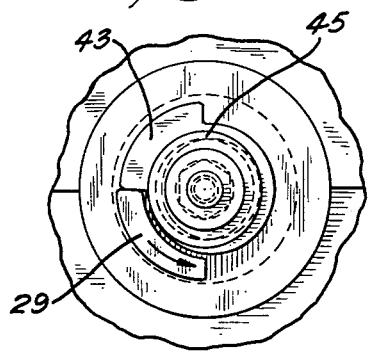
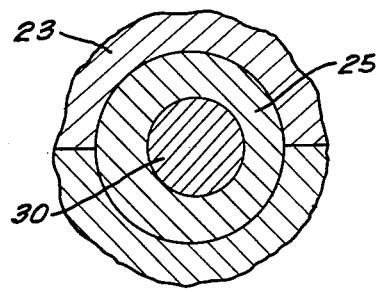
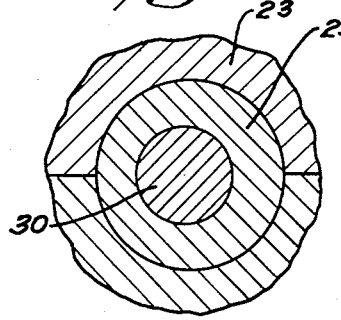
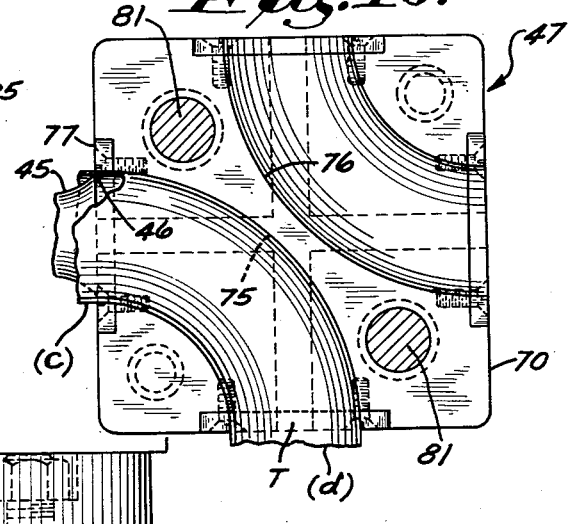
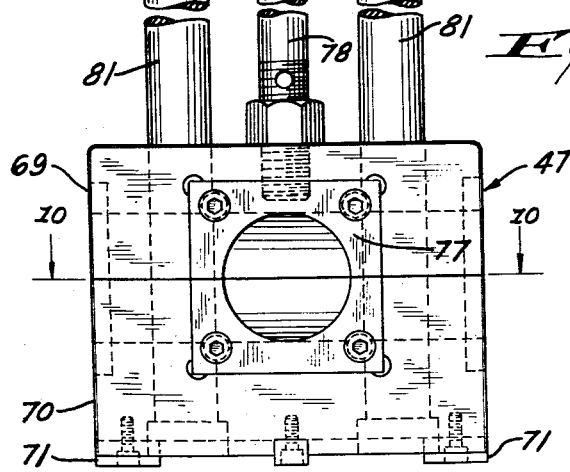
INVENTOR.
Frank C. Polanski
BY
ATTORNEYS.

Feb. 27, 1962 F. C. POLANSKI 3,022,692
TUBE TRIMMING MACHINE
Filed Feb. 27, 1958 4 Sheets-Sheet 4
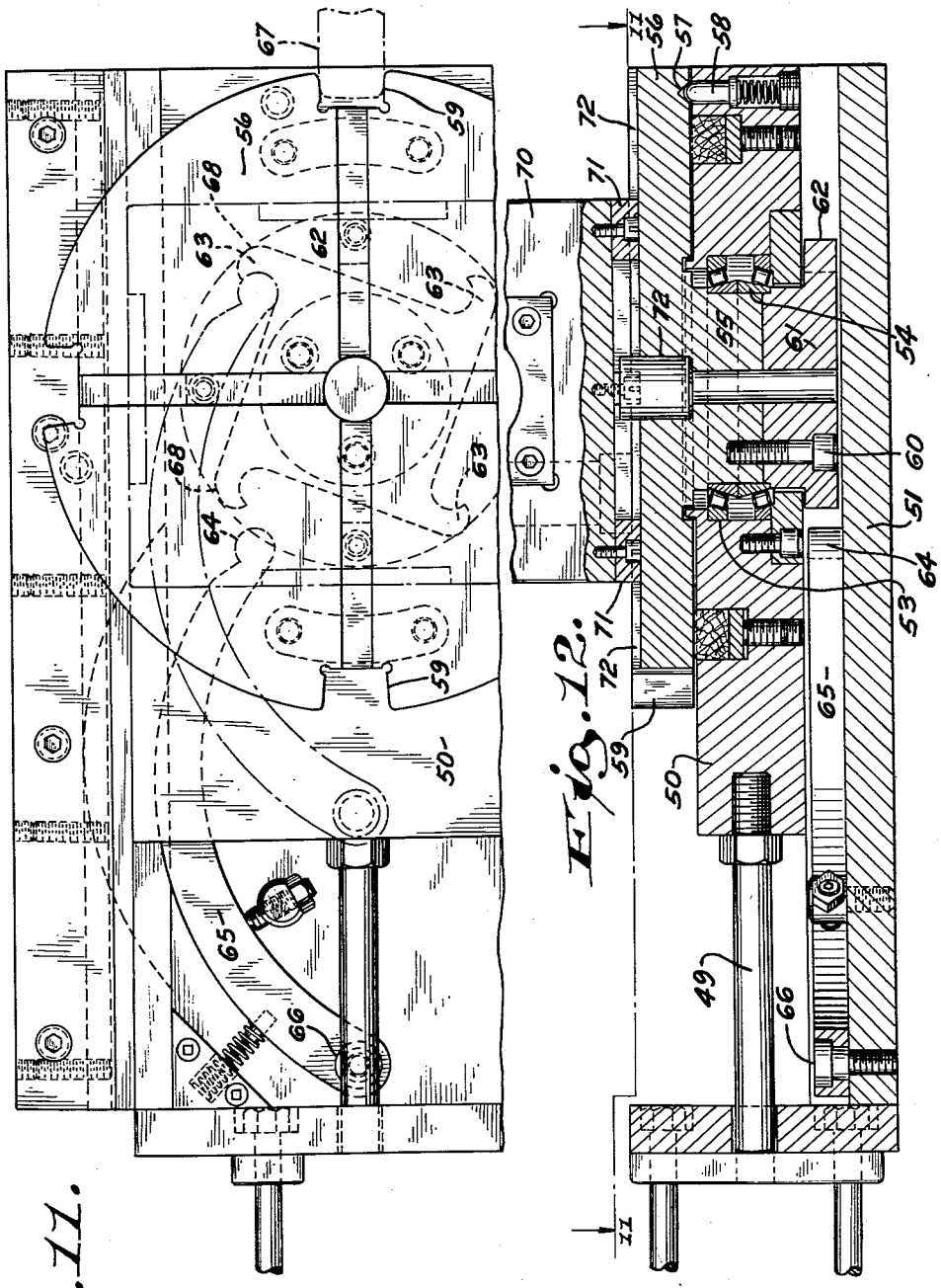
INVENTOR.
Frank C. Polanski
BY
Morsell & Morsell
ATTORNEYS.

United States Patent Office 3,022,692
Patented Feb. 27, 1962

3,022,692
TUBE TRIMMING MACHINE
Frank C. Polanski, Kenosha, Wis., assignor to Ladish Co., Cudahy, Wis., a corporation of Wisconsin
Filed Feb. 27, 1958, Ser. No. 718,063
4 Claims. (Cl. 82—59)

This invention relates to improvements in tube trimming machines.

Heretofore in order to finish the ends of a tube or the ends of elbows, T's, crosses, or the like, it has been necessary to first saw off the ends and then face the ends in a separate fixture. This required two operations. It has also been customary in trimming the ends of tubes to have the cutter work from the outside in. This is often objectionable as it is likely to leave burrs on the inside. Furthermore, sawing from the outside in tends to press the tube end inwardly out of size.

It is a general object of the present invention to provide a tube trimming machine which is adapted to trim, face and size in a single operation.

A more specific object of the invention is to provide a tube trimming machine which operates from the inside out while the tube end is held in a die, so that if the tube end was not originally perfect it is sized back into true circular form by the action of the cutter working toward the outside to press the tube end against the die.

With the above and other objects in view, the invention consists of the improved tube trimming machine, and all of its parts and combinations, as set forth in the claims, and all equivalents thereof.

In the accompanying drawings, illustrating one complete embodiment of the preferred form of the invention, in which the same reference numerals designate the same parts in all of the views:

FIG. 6 is a fragmentary view similar to the central part of FIG. 5, showing the parts in loading position;

FIG. 7 is a sectional view through the spindle and sleeve showing the relative eccentric position of these parts when the external mechanism is in the position of FIG. 6 which is loading position;

FIG. 8 is a view similar to FIG. 7 showing the spindle in its eccentric bearing, while in cutting position corresponding to the position of FIG. 5;

FIG. 9 is a view looking at the end of a set of elbow-holding dies taken approximately on the line 9—9 of FIG. 1;

FIG. 10 is a view showing the lower part of the elbow-holding dies taken along the line 10—10 of FIG. 9;

FIG. 11 is a fragmentary top view taken on the line 11—11 of FIG. 12, of the turntable and associated mechanism with the elbow-holding die set removed;

FIG. 12 is a longitudinal vertical sectional view through the mechanism of FIG. 11 and through a part of the assembled elbow holding die set; and FIG. 13 is a fragmentary plan view looking down on the base for the trimming unit to show the index locking finger.

Figure 1:
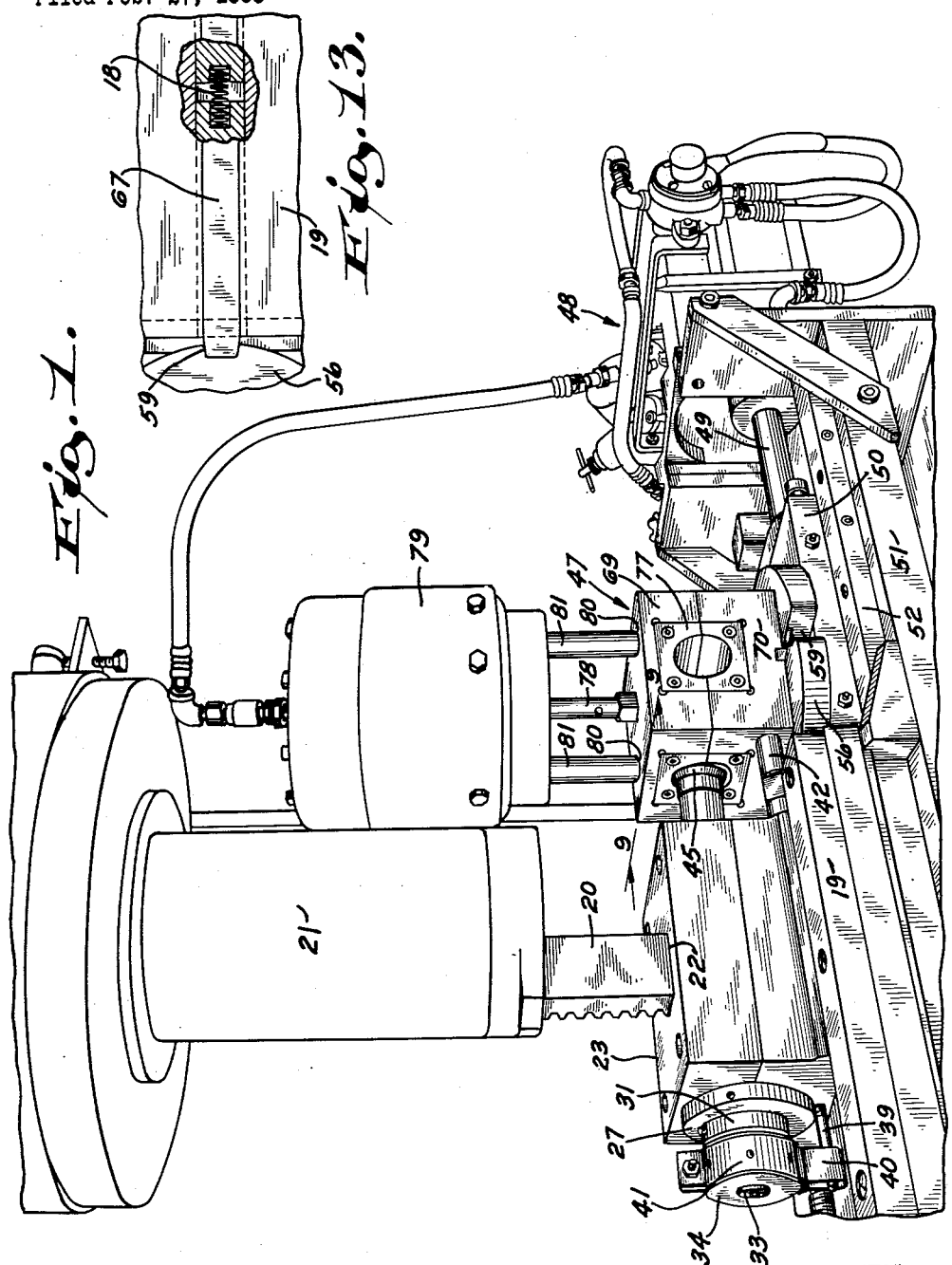
FIG. 1 is a perspective view of a tube trimming machine embodying the features of the present invention, parts being broken away.
Figure 5:
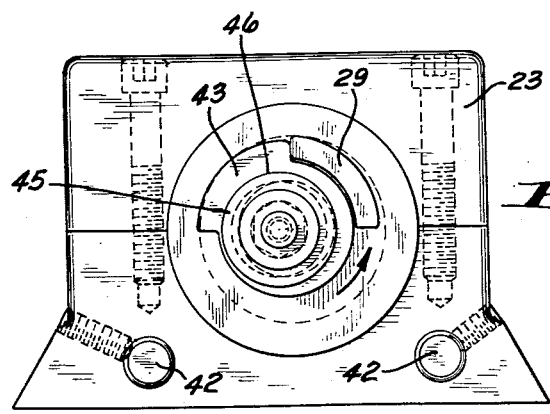
FIG. 5 is a view looking at the end of the mechanism of FIG. 2 showing the cutter driving lug in one operative position for cutting.

Referring more particularly to FIGS. 1 and 5 of the drawings, a vertical rack bar 20 which is suitably driven by pneumatic or other mechanism 21 has its lower end extending into a slot 22 in the top of a housing 23 which is adjustably fixed in a base 19. Journaled within a bore 24 of the housing (see FIG. 2) is a sleeve 25. The central portion of the sleeve is of reduced diameter and carries a pinion 26 which is engaged by the teeth of the rack 20 to impart rotation to the sleeve 25.

The sleeve 25 has one end projecting from the rear end of the housing and fitted with an external threaded collar 27 which is removably held in place by a set screw 28. The other end of the sleeve projects from the forward end of the housing and has an enlarged head carrying an arcuate lug 29 which is best shown in FIG. 5.

Figure 2:
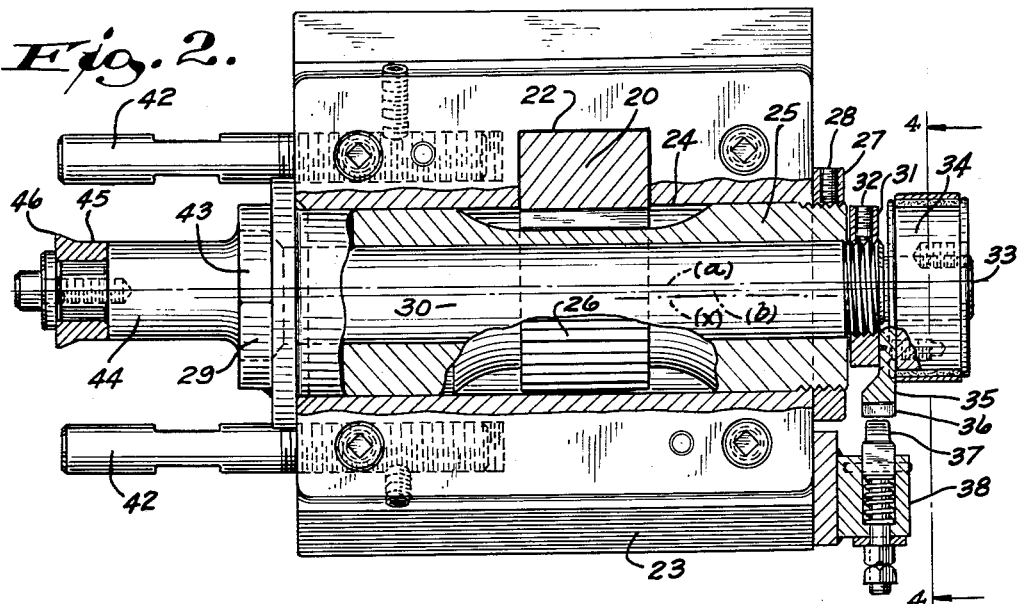
FIG. 2 is a top view of the trimming mechanism alone, parts being broken away and shown in horizontal section.

The bore of the sleeve is eccentric and rotatably receives a spindle 30 so that the spindle rotates on an axis (b) while the sleeve rotates on an axis (x), FIG. 2. The other end of the spindle 30 projects beyond the projecting end of the sleeve 25 and carries an internally threaded collar 31 which is detachably held in position by a set screw 32. The spindle has a portion 33 of reduced diameter projecting beyond the collar and carrying a brake drum 34 which is keyed thereto. Secured to the inner face of the brake drum 34 and projecting beyond its periphery is a latching plate 35 having a latching recess 36 which is adapted to co-act with a yieldingly mounted latch 37 slidable in a holder 38, the latter being suitably connected to the housing 23.

Figures 3, 4:
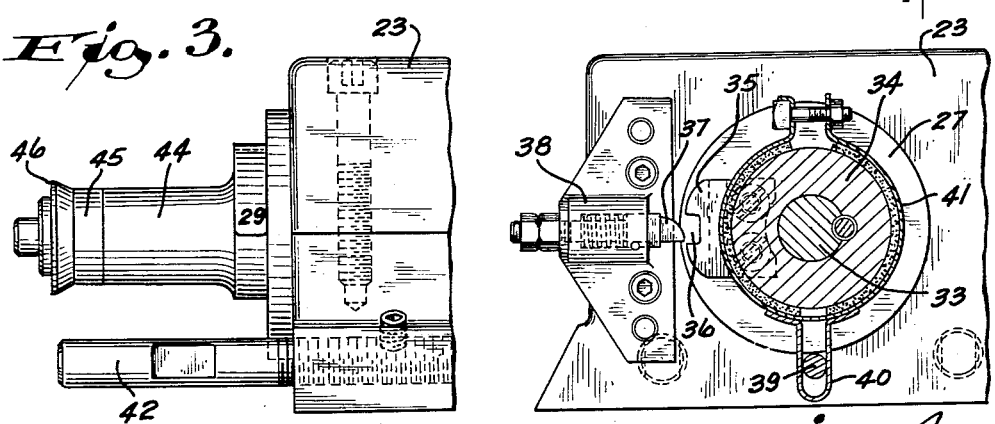
FIG. 3 is a fragmentary side elevation view of the mechanism of FIG. 2.
FIG. 4 is a sectional view taken on the line 4—4 of FIG. 2.

A pin 39 projecting from the housing 23 extends through a loop 40 which projects from a brake band 41 (see FIG. 4).

Guide pins 42 which adjustably project from the inner end of the housing 23 are adapted to abut the work holding die (see FIGS. 1 and 9) to locate the die with respect to the trimmer when the parts are in trimming position.

The arrangement is such that when the rack 20 is moved in a downward direction by its operating mechanism 21, the dog 29 of the sleeve 25 moves in the direction of the arrow in FIG. 6 until it engages a lug 43 mounted on a projecting eccentric portion 44 of the spindle, the centerline of which is indicated at (a). During this movement the plate 35 of FIG. 4 is in a laterally extended position so that its recess 36 is engaged by the latch 37. This prevents premature rotation of the spindle as a result of friction between the spindle and the sleeve 25. By the time the end of the lug 29 on the sleeve has engaged the lug 43 on the spindle as in FIG. 5 there has been sufficient eccentric movement of the spindle due to the eccentric position of the bore in the sleeve 25 to pull the latch plate 35 inwardly out of engagement with latch 37. As soon as this latching engagement is broken, continued downward movement of the rack 20 will cause rotation of the spindle together with the trimmer 45 thereon, which trimmer has a cutting edge 46.

When the mechanism is in loading position, the axis of the trimmer 45 is in alinement with the axis of the tube T to be trimmed and the trimmer 45 is of less diameter than the interior diameter of the tube to be trimmed and is overlapped by the end portion (c) of the tube which is to be cut off, which tube is supported in the supporting saddle 47 as will be hereinafter explained.

During the movement of the sleeve-carried lug 29 from the position of FIG. 6 to the position of FIG. 5 while the spindle 30 is being kept from rotation by the latch 37, the axis of the spindle 30 is nevertheless being shifted because of the difference in the center lines (x) and (b). This results in a gradual outward feed of the cutting edge 46 of the trimmer, as shown in FIG. 10, through the thickness of the metal of the tube to be trimmed. This outward feed movement ends when the sleeve lug 29 hits the spindle lug 43 as in FIG. 5. Thereafter the cutter which is on the eccentric axis (a) travels in a circular path until it has cut off the entire end of the tube, this requiring 360° of travel from the position of FIG. 5.

After the tube end (c) of FIG. 10 has been cut off, the operator causes the mechanism 21 to raise the rack and during such upward movement the rack rotates the parts in a reverse direction to bring the trimmer back to loading position where it is again concentric with the tube to be cut. During this reverse movement and after the plate 35 has been moved outwardly, the latching recess 36 and plate 35 slip over the curved side of the spring loaded latch 37. Also during such reverse movement the brake band 41 is in engagement with the drum 34 to prevent rotation of the spindle 30, allowing its axis to be returned to the loading position. The engagement of the loop 40 with the pin 39 as shown in FIG. 4, allows movement of the brake band during these eccentric changes.

The Turntable and Associated Mechanism

Referring first to FIG. 1, suitable pneumatic mechanism 48, or other source of power, is operable to reciprocate a ram 49. The latter is connected to a slide 50 slidable on the frame 51 between rails 52. The slide has a circular opening 53 for receiving a bearing set 54 (see FIG. 12). Within the bearing set the hub 55 of a turntable 56 is rotatably supported to provide for rotation of the turntable relative to the upper surface of the slide 50. The bottom of the turntable is provided with suitably spaced indexing notches 57 adapted to co-act with yielding pins 58 to yieldably hold the turntable in a selected position of rotation. The turntable is also provided with four peripheral recesses 59. Secured to the bottom of the hub 55 of the turntable by bolts 60 is the hub 61 of a star-wheel 62, the star-wheel proper being in a plane below the bottom of the slide 50 and having four projections 63 (see FIG. 11) positioned for co-action with the end 64 of a dog 65. The latter is pivoted as at 66 to base 51. An index locking finger 67 is adapted to co-act with one of the recesses 59 to lock the turntable in a predetermined indexed position. As shown in FIG. 13, the finger 67 is slidably mounted in the base 19 for the unit 23 against the tension of a spring 18, and is adapted to enter one of the recesses 59 when the turntable is moved by the ram 49 to trimming position.

From the above description it is clear that when the ram 49 is pushed toward the left, referring to FIG. 1, or toward the right, referring to FIG. 12, it will push the slide 50 with the turntable 56 toward the trimmer to a position where the projecting end (c), (FIG. 10) of the tube T to be trimmed overlaps the cutting edge 46 as will be hereinafter referred to in detail. At the end of this movement one of the turntable recesses 59 engages the end of the index locking finger 67, as shown by dot and dash lines in FIG. 11. This locks the turntable against rotation during cutting. While the inward movement of the slide is taking place the curved surface 68 of one of the projections 63 of the star-wheel slips past the end 64 of the dog 65 until the dog is in the full line position of FIG. 11 with respect to the star-wheel 62. After the tube end has been trimmed, the ram 49 is retracted, causing one of the star-wheel projections 63 to engage the rounded end 64 of the dog 65 as shown by the dot and dash line position of FIG. 11. Thereafter as the slide is retracted the star-wheel and turntable are turned a quarter of a revolution. Then on the next forward stroke the star-wheel slips past the end 64 of the spring mounted dog 65. This quarter turn indexing is used to bring a new tube end into position for cutting during the next cycle as will be hereinafter explained.

The Tube Holding Saddle

The tube holding saddle 47 includes an upper half 69 and the lower half 70. The lower half 70 has bottom keys 71 (see FIG. 12) received in four keyways 72 of the turntable, 90° from each other, to locate the die on the turntable, so that it will rotate therewith. The tube holding saddle members may have recesses shaped to receive whatever work is to be trimmed. For purposes of illustration FIG. 10 shows recesses 75 and 76 shaped to receive a pair of elbows to be trimmed, there being co-operating recess portions in the upper and lower saddle parts. In FIG. 10 an elbow T is shown in place in one recess only. At the ends of each recess are cutting inserts 77, each having a semi-circular opening. The upper saddle member is adapted to be raised and lowered by a ram 78 operated by suitable mechanisms such as the pneumatic means 79 shown. The upper holding saddle part has holes 80 for slidably receiving guide rods 81 so that the part is slidable upwardly on the guide rods when the saddle is opened. The lower ends of these guide rods are anchored in the lower half 70 as illustrated in FIG. 9.

Summary of Operation

In order to insert work in the device, the operator manipulates a suitable control to raise the upper half 69 of the work holding saddle 47. This exposes the lower half as shown in FIG. 10 and an elbow T with projecting ends (c) and (d) to be trimmed is inserted in each of the recesses 75 and 76. In FIG. 10 such an elbow is shown in one recess only. Thereafter the top 69 of the holding block set is lowered. Next, the operator shifts a suitable control to cause the ram 49 to move the slide toward the left, referring to FIG. 1, until the cutting periphery 46 of the trimmer 45 is substantially flush with the outer surface of the cutting insert 77. At this point in the cycle of operation the axis of the trimmer 45 is concentric with the axis of the tube T to be trimmed.

The mechanism 21 is then operated to cause the rack 20 to be lowered, which operation has heretofore been described, to move the cutter eccentrically until the cutting edge engages the inside of the overhanging tube end, such as end (c) in FIG. 10, and the eccentric movement of the trimmer continues until the edge 46 has cut through the thickness of the tube material. Thereafter, the eccentric feed movement stops and the trimmer 45 is moved 360° in a circular path while it is rotating, to trim off the tube end from the inside out. During such trimming the material of the tube is pressed outwardly against the cutting insert so that it is simultaneously resized if it was at all out of shape. At the same time the rotating cutter faces the trimmed edge so that no subsequent facing operation is necessary.

After the end has been cut the operator moves the control to cause retraction of the ram 49. This pulls the slide 50 inwardly causing the star-wheel 62 to engage the dog 65 as heretofore explained to index the turntable 90° and turn the work holding saddle a corresponding amount so that another tube end is ready to be trimmed. After all four tube ends have been trimmed, the trimmed elbows are removed and additional work inserted for a subsequent operation.

It is to be understand that the present invention is not to be limited to the exact details of construction shown and described, for obvious modifications will occur to persons skilled in the art.

What I claim is:

1. Tube trimming apparatus comprising supporting means including a die for embracing the exterior of a tube while permitting an end which is to be trimmed to project, a sleeve mounted for rotation with its axis of rotation in substantial alinement with the axis of said tube end, a spindle journaled eccentrically in said sleeve and having an end projecting toward the tube end to be trimmed, a trimmer fixed to said projecting end to be rotated by said spindle and adapted to be within and overlapped by said projecting tube end, means for rotating said sleeve, means for temporarily locking said spindle against rotation during rotation of said sleeve for a partial revolution so as to cause the trimmer when overlapped by said tube end to be moved outwardly by the eccentrically journaled spindle through the thickness of the metal of the tube, means for automatically releasing said spindle lock, and means for thereafter causing the spindle and trimmer to rotate with the sleeve while the latter moves the trimmer in a circular path around the interior of the tube to trim off the projecting end thereof.

2. Tube trimming apparatus comprising supporting means including a die for embracing the exterior of a tube while permitting an end which is to be trimmed to project, a sleeve mounted for rotation with its axs of rotation in substantial alinement with the axis of said tube end, a spindle journaled eccentrically in said sleeve and having an end projecting toward the tube end to be trimmed, a trimmer fixed to said projecting end to be rotated by said spindle and adapted to be within and overlapped by said projecting tube end, means for rotating said sleeve, means for temporarily locking said spindle against rotation during rotation of said sleeve for a partial revolution so as to cause the trimmer when overlapped by said tube to be moved outwardly by the eccentrically journaled spindle through the thickness of the metal of the tube, means responsive to said eccentric movement of the spindle for automatically releasing said spindle lock, and means for thereafter causing the spindle and trimmer to rotate with the sleeve while the latter moves the trimmer in a circular path around the interior of the tub to trim off the projecting end thereof.

3. Tube trimming apparatus comprising supporting means including a die for embracing the exterior of a tube while permitting an end which is to be trimmed to project, a sleeve mounted for rotation with its axis of rotation in substantial alinement with the axis of said tube end, a spindle journaled eccentrically in said sleeve and having an end projecting toward the tube end to be trimmed, a trimmer fixed to said projecting end to be rotated by said spindle and adapted to be within and overlapped by said projecting tube end, means for rotating said sleeve, a brake drum on said spindle, an external brake band positioned to coact with said brake drum for preventing spindle rotation during return of the spindle to loading position, mounting means for said external brake band providing eccentric movement with the spindle, means other than said external brake band for locking the spindle against rotation during rotation of the sleeve for a part revolution to cause the trimmer when overlapped by said tube end to be moved outwardly by the eccentrically journaled spindle through the thickness of the metal of the tube, means for automatically releasing said spindle lock, and means for thereafter causing the spindle and trimmer to rotate with the sleeve while the latter moves the trimmer in a circular path around the interior of the tube to trim off the projecting end thereof.

4. Tube trimming apparatus comprising supporting means including a die for embracing the exterior of a tube while permitting an end which is to be trimmed to project, a sleeve mounted for rotation with its axis of rotation in substantial alinement with the axis of said tube end, a spindle journaled eccentrically in said sleeve and having an end projecting toward the tube end to be trimmed, a trimmer fixed to said projecting end to be rotated by said spindle and adapted to be within and overlapped by said projecting tube end, means for rotating said sleeve, a lug on said sleeve, a lug on said spindle positioned to be engaged by the sleeve lug after the sleeve has been rotated a part of a revolution, means for temporarily locking said spindle against rotation while the sleeve lug is being moved into engagement with the spindle lug whereby the trimmer when overlapped by said tube end is moved outwardly by the eccentrically journaled spindle through the thickness of the metal of the tube, and means for releasing said spindle lock at substantially the time the sleeve lug engages the spindle lug, said lug engagement causing the spindle and trimmer to thereafter rotate with the sleeve while the latter moves the trimmer in a circular path around the interior of the tube to trim off the projecting end thereof.

References Cited in the file of this patent

UNITED STATES PATENTS

| | | |
|---|---|---|
| 239,875 | Spaulding | Apr. 5, 1881 |
| 1,124,167 | Phillips | Jan. 5, 1915 |
| 1,807,671 | Phelps | June 2, 1931 |
| 1,975,007 | Kingsbury | Sept. 25, 1934 |
| 2,125,269 | Buff | Aug. 2, 1938 |

FOREIGN PATENTS

| | | |
|---|---|---|
| 600,153 | Great Britain | Apr. 1, 1948 |